(12) United States Patent
Gafurov et al.

(10) Patent No.: US 12,265,558 B2
(45) Date of Patent: Apr. 1, 2025

(54) OBJECT CENTRIC PROCESS MINING ALGORITHM

(71) Applicant: UiPath, Inc., New York, NY (US)

(72) Inventors: Bulat Aydarovich Gafurov, Veldhoven (NL); Dennis Brons, Eindhoven (NL); Robin Johannes Pieter Mennens, Eindhoven (NL); Roeland Johannus Scheepens, Eindhoven (NL); Ruud Andriessen, Eindhoven (NL)

(73) Assignee: UiPath, Inc., New York, NY (US)

( * ) Notice: Subject to any disclaimer, the term of this patent is extended or adjusted under 35 U.S.C. 154(b) by 0 days.

(21) Appl. No.: 18/063,605

(22) Filed: Dec. 8, 2022

(65) Prior Publication Data
US 2024/0193189 A1 Jun. 13, 2024

(51) Int. Cl.
*G06F 16/28* (2019.01)
*G06F 16/21* (2019.01)

(52) U.S. Cl.
CPC .......... *G06F 16/288* (2019.01); *G06F 16/212* (2019.01)

(58) Field of Classification Search
CPC .... G06F 16/288; G06F 16/212; G06F 16/258; G06F 16/9024; G06F 16/26; G06F 21/1078; G06F 2216/03; G06F 40/205; G06Q 10/0631; G06Q 10/06315; G06Q 10/06375; G06Q 30/0201; G06Q 10/087
USPC ................................. 707/802, 806
See application file for complete search history.

(56) References Cited

U.S. PATENT DOCUMENTS

| 8,619,084 | B2 | 12/2013 | Curbera et al. |
| 10,796,257 | B2 | 10/2020 | Rinke et al. |
| 11,741,131 | B1* | 8/2023 | Dwivedi ............. G06F 16/2474 707/758 |
| 2008/0162552 | A1* | 7/2008 | Bonev ........................ G06F 8/75 |
| 2011/0218793 | A1* | 9/2011 | Chockler .................. G06F 9/44 703/20 |
| 2011/0267351 | A1* | 11/2011 | Curbera ................ G06T 11/206 345/440 |
| 2015/0142707 | A1* | 5/2015 | Charif .................... G06N 20/00 706/12 |

(Continued)

FOREIGN PATENT DOCUMENTS

| CN | 111382277 A | 7/2020 |
| WO | 2018/138601 A1 | 8/2018 |

OTHER PUBLICATIONS

Aalst et al. Article: "Discovering Object-Centric Petri Nets", Process and Data Science (PADS), RWTH Aachen University, Aachen, Germany, www.vdaalst.com, DOI: 10.3233/FI-2020-1946, Journal: Fundamenta Informaticae, vol. 175, No. 1-4, pp. 1-40, 2020; Published: Sep. 28, 2020. (Year: 2020).*

(Continued)

*Primary Examiner* — Evan Aspinwall
(74) *Attorney, Agent, or Firm* — Chiesa Shahinian & Giantomasi PC

(57) ABSTRACT

Systems and methods for object centric process mining are provided. Execution data of a process having a plurality of entities is received. A plurality of object networks representing relationships between objects of the plurality of entities are generated based on the execution data. A set of transitions is determined for each of the plurality of object networks. A process graph of execution of the process is generated based on the sets of transitions. The process graph is output.

20 Claims, 11 Drawing Sheets

(56) References Cited

U.S. PATENT DOCUMENTS

| | | | | |
|---|---|---|---|---|
| 2015/0269774 | A1* | 9/2015 | Lissone | G06T 17/10 |
| | | | | 345/420 |
| 2015/0302327 | A1* | 10/2015 | McCann | G06Q 10/0633 |
| | | | | 705/7.38 |
| 2016/0154874 | A1* | 6/2016 | Fukuda | G06F 16/285 |
| | | | | 707/740 |
| 2017/0111245 | A1* | 4/2017 | Ishakian | G06Q 10/0633 |
| 2021/0004386 | A1* | 1/2021 | Andritsos | G06F 16/26 |
| 2021/0073285 | A1* | 3/2021 | Hunter | H04L 9/3263 |
| 2021/0157583 | A1* | 5/2021 | Yuile | G06F 9/542 |
| 2023/0102089 | A1* | 3/2023 | Bellubbi | G06F 11/0757 |
| | | | | 714/55 |
| 2023/0237085 | A1* | 7/2023 | Jayanthi | G06F 16/31 |
| | | | | 707/740 |

OTHER PUBLICATIONS

Aalst et al. Article: "Discovering Object-Centric Petri Nets", Process and Data Science (PADS), RWTH Aachen University, Aachen, Germany, www.vdaalst.com DOI: 10.3233/FI-2020-1946, Journal: Fundamenta Informaticae, vol. 175, No. 1-4, pp. 1-40, (Year: 2020).*

Aalst et al. Article: "Discovering Object-Centric Petri Nets", Process and Data Science (PADS), RWTH Aachen University, Aachen, Germany, www.vdaalst.com Journal: Fundamenta Informaticae, vol. 175, No. 1-4, pp. 1-40, 2020; Published: Sep. 28, 2020 (Year: 2020).*

Abstract. Techniques to discover Petri nets from event data assume precisely one case identifier per event. These case identifiers are used to correlate events, and the resulting discovered Petri net aims to describe the life-cycle of individual cases. (Year: 2020).*

Van der Aalst, "Object-Centric Process Mining: Dealing with Divergence and Convergence in Event Data," 2019, Software Engineering and Formal Methods, pp. 3-25.

Adams et al., "Precision and Fitness in Object-Centric Process Mining," 2021, the Proceedings of the 3rd International Conference on Process Mining (ICPM 2021), 8 pgs.

Gartner Research, "Market Guide for Process Mining," 2020, retrieved online on Dec. 6, 2022, Abstract from https://www.gartner.com/en/documents/3991229, 5 pgs.

RWTH Aachen University, "OCEL Standard," 2020, retrieved online from http://ocel-standard.org/, 28 pgs.

PM4Py, "Object-Centric Event Logs," retrieved online on Dec. 6, 2022, from: https://pm4py.fit.fraunhofer.de/documentation#object-centric-event logs, 47 pgs.

Meyer et al., "Associative Intelligence for Object-Centric Process Mining with MPM (Extended Abstract)," 2021, International Conference on Process Mining, 2 pgs.

IBM Support, "Multi-Level Process Mining: What is it? How is it different from the traditional approach?," retrieved online on Dec. 6, 2022, from https://www.ibm.com/support/pages/node/6484277, 2 pgs.

IBM Business Automation Community, Process Mining Forum, retrieved online on Dec. 6, 2022, from: https://community.ibm.com/community/user/automation/blogs/patrick-megard1/2021/06/02/what-is-multi-level-process-mining-and-why-it-does, 6 pgs.

YouTube Video, IBM, "Procure to Pay Automotive case study (myInvenio Process Mining & DTO)," 2020, https://www.youtube.com/watch?v=aP9Cd9_GCWk&t=73s.

Berti et al., "Extracting Multiple Viewpoint Models from Relational Databases," 2020, Lecture Notes in Business Information Processing, vol. 379, 28 pgs.

Lu et al., "Discovering Interacting Artifacts from ERP Systems," 2015, IEEE Transactions on Services Computing, vol. 8, Issue: 6, pp. 861-873.

Popova et al., "Artifact Lifecycle Discovery," 2015, International Journal of Cooperative Information Systems, vol. 24, No. 01, 27 pgs.

Van der Aalst et al., "Discovering Object-centric Petri Nets," 2020, Fundamenta Informaticae, vol. 175, No. 1-4, pp. 1-40.

Fahland, "Artifact centric process mining," 2018, Encyclopedia of Big Data Technologies, 13 pgs.

Fahland, "Process Mining over Multiple Behavioral Dimensions with Event Knowledge Graphs," 2022, Lecture Notes in Business Information Processing book series (LNBIP,vol. 448), pp. 274-319.

YouTube Video, Fahland, "Multi Dimensional Process Analysis (Tutorial at BPM 2022)," 2022, https://www.youtube.com/watch?v=X2CjOb4Usug&t=2421s.

Li et al., "Configurable Event Correlation for Process Discovery from Object-Centric Event Data," 2018, 2018 IEEE International Conference on Web Services (ICWS), pp. 203-210.

Van Eck et al., "Multi-instance Mining: Discovering Synchronisation in Artifact-Centric Processes," 2019, Business Process Management Workshops. BPM 2018. Lecture Notes in Business Information Processing, vol. 342, 12 pgs.

Berti et al., "OC-PM: analyzing object-centric event logs and process models," 2022, International Journal on Software Tools for Technology Transfer, 17 pgs.

Adams et al., "OCπ: Object-Centric Process Insights," 2022, Lecture Notes in Computer Science book series (LNCS, vol. 13288), 12 pgs.

Li et al., "Automatic Discovery of Object-Centric Behavioral Constraint Models," 2017, Lecture Notes in Business Information Processing book series (LNBIP,vol. 288), 15 pgs.

Celonis Product Documentation, "Multi-Event Log," retrieved online on Dec. 6, 2022, from https://docs.celonis.com/en/multi-event-log.html, 2 pgs.

PM4Py, "State-of-the-art-process mining in Python," Documentation webpage, retrieved online on Dec. 6, 2022, from: https://pm4py.fit.fraunhofer.de/docs, 2 pgs.

* cited by examiner

302 → Sales order ID
| Sales order ID |
|---:|
| 0 |
| 1 |
| 2 |
| 3 |
| 4 |

312 → Sales order item ID
314 → Sales order ID

| Sales order item ID | Sales order ID |
|---:|---:|
| 1 | 1 |
| 2 | 2 |
| 3 | 3 |
| 4 | 4 |
| 5 | 4 |
| 6 | 4 |

| Delivery item ID | Delivery ID | Sales order item ID |
|---:|---:|---:|
| 1 | 1 | 1 |
| 2 | 2 | 2 |
| 3 | 3 | 3 |
| 4 | 3 | 3 |
| 5 | 3 | 3 |
| 6 | 4 | 4 |
| 7 | 4 | 5 |
| 8 | 4 | 6 |

322 → Delivery item ID
324 → Delivery ID
326 → Sales order item ID

| Delivery ID |
|---:|
| 0 |
| 1 |
| 2 |
| 3 |
| 4 |

332 → Delivery ID

| Activity (404) | Timestamp (406) | (408) | (410) | (412) | (414) |
|---|---|---|---|---|---|
| Create Sales Order | 01/02/2020 12:00 | | | | 0 |
| Post Goods Issue | 02/02/2020 12:00 | | | | |
| Create Sales Order | 03/02/2020 12:00 | | | | |
| Create Sales Order Item | 04/02/2020 12:00 | 0 | 1 | 1 | 1 |
| Create Delivery Item | 05/02/2020 12:00 | | | | |
| Post Goods Issue | 06/02/2020 12:00 | | | | |
| Create Sales Order | 07/02/2020 12:00 | | | | |
| Create Sales Order Item | 08/02/2020 12:00 | 1 | 2 | 2 | 2 |
| Change SO requested delivery date | 09/02/2020 12:00 | | | | |
| Create Delivery Item | 10/02/2020 12:00 | 2 | | | |
| Post Goods Issue | 11/02/2020 12:00 | | | | |
| Create Sales Order | 12/02/2020 12:00 | | | | |
| Create Sales Order Item | 13/02/2020 12:00 | | 3 | 3 | 3 |
| Create Delivery Item | 14/02/2020 12:00 | 3 | 4 | | |
| Create Delivery Item | 15/02/2020 12:00 | | 3 | 4 | |
| Change delivery item quantity | 16/02/2020 12:00 | | 4 | | |
| Change delivery item quantity | 17/02/2020 12:00 | | 5 | | |
| Create Delivery Item | 18/02/2020 12:00 | | 5 | | |
| Change delivery item quantity | 19/02/2020 12:00 | | 5 | | |
| Post Goods Issue | 20/02/2020 12:00 | 3 | | | |
| Create Sales Order | 21/02/2020 12:00 | | | | |
| Create Sales Order Item | 22/02/2020 12:00 | | 6 | 4 | 4 |
| Create Sales Order Item | 23/02/2020 12:00 | | 7 | | 5 |
| Create Delivery Item | 24/02/2020 12:00 | | | | 6 |
| Create Delivery Item | 25/02/2020 12:00 | | 8 | | |
| Create Delivery Item | 26/02/2020 12:00 | | | | |
| Create Delivery Item | 27/02/2020 12:00 | | | | |
| Post Goods Issue | 28/02/2020 12:00 | 4 | | | |

}

OBJECT CENTRIC PROCESS MINING ALGORITHM

FIELD

The present invention generally relates to process mining, and more specifically, to an end-to-end object centric process mining algorithm that considers all entities of a process for visualizing execution of the process in a process graph.

BACKGROUND

Process mining refers to the process of gathering and analyzing data from systems to, for example, identify what end-to-end processes exist in an organization and how to automate them effectively, as well as indicate what the impact of the automation will be. Conventionally, process mining is performed by transforming execution data of a process into an event log. A process typically comprises multiple entities representing abstract conceptual groupings of events of the process. However, to generate the event log, only one of the entities is selected for analysis, thereby flattening the multi-dimensional execution data into a single dimension. This results in an event log that may not include all of the data in the execution data, that may include behavior that does not exist in the execution data, that may include duplicate data, and that may result in computation of incorrect metrics. Accordingly, an improved and/or alternative approach may be beneficial.

SUMMARY

Certain embodiments of the present invention may provide alternatives or solutions to the problems and needs in the art that have not yet been fully identified, appreciated, or solved by current process mining technologies. For example, some embodiments of the present invention pertain to end-to-end object centric process mining that considers all entities of a process for visualizing execution of the process in a process graph.

In accordance with one embodiment, systems and methods for object centric process mining are provided. Execution data of a process having a plurality of entities is received. A plurality of object networks representing relationships between objects of the plurality of entities are generated based on the execution data. A set of transitions is determined for each of the plurality of object networks. A process graph of execution of the process is generated based on the sets of transitions. The process graph is output.

In one embodiment, the sets of transitions are determined by generating an ordered object network trace for the respective object network. For a current event of the ordered object network trace, the current event initially being a first event of the ordered object network trace, the following steps are performed: a) it is determined whether the current event satisfies one or more halting conditions; b) in response to determining that the current event does not satisfy the one or more halting conditions, it is determined whether the current event satisfies one or more skip conditions; c) in response to determining that the current event does not satisfy the one or more skip conditions, a transition between the start event and the current event is added to the set of transitions, an event immediately prior to the current event in the ordered object network trace is defined to be the new current event, and the method returns to step a); and d) in response to determining that the current event satisfies the one or more halting conditions, an event immediately after the start event in the ordered object network trace is defined to be the new start event and the method returns to step a). The set of transitions is output.

In one embodiment, in response to determining that the current event belongs to the same object as the start event, a directly follows transition between the start event and the current event is added to the set of transitions. In one embodiment, the one or more halting conditions comprise at least one of: 1) the current event being the first event of the ordered object network trace, 2) the current event being of the same object as the start event, or 3) the current event being of a second different entity type encountered between the start event and the current event in the ordered object network trace. In one embodiment, the one or more skipping conditions comprise at least one of: 1) the current event being of a same entity but different object than any event between the start event and the current event in the ordered object network trace or 2) the current event belonging to the same object than any event between the start event and the current event in the ordered object network trace.

In one embodiment, the execution data comprises 1) an object table, for each of the plurality of entities, identifying the objects of that entity and 2) an event table identifying events of the plurality of entities.

In one embodiment, the plurality of object networks is generated as connected components of the objects of the entities that are related.

In one embodiment, the process graph is generated by representing each activity of the sets of transitions as a node of the process graph and transitions between the activities in the sets of transitions as edges connecting the nodes and weighting one or more of the edges based on a frequency count of transitions between the same activities in the sets of transitions.

In one embodiment, the process is a robotic process automation process.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which:

FIG. 3A shows an exemplary object table for a sales order entity in accordance with one or more embodiments.

FIG. 3B shows an exemplary object table for a sales order item entity in accordance with one or more embodiments.

FIG. 3C shows an exemplary object table for the delivery item entity in accordance with one or more embodiments.

FIG. 3D shows an exemplary object table for the delivery entity, in accordance with one or more embodiments.

FIG. 4 shows an exemplary event table in accordance with one or more embodiments.

Unless otherwise indicated, similar reference characters denote corresponding features consistently throughout the attached drawings.

DETAILED DESCRIPTION OF THE EMBODIMENTS

Some embodiments pertain to end-to-end object centric process mining that considers all entities of a computer process for visualizing execution of the process in a process graph.

Figure 1:
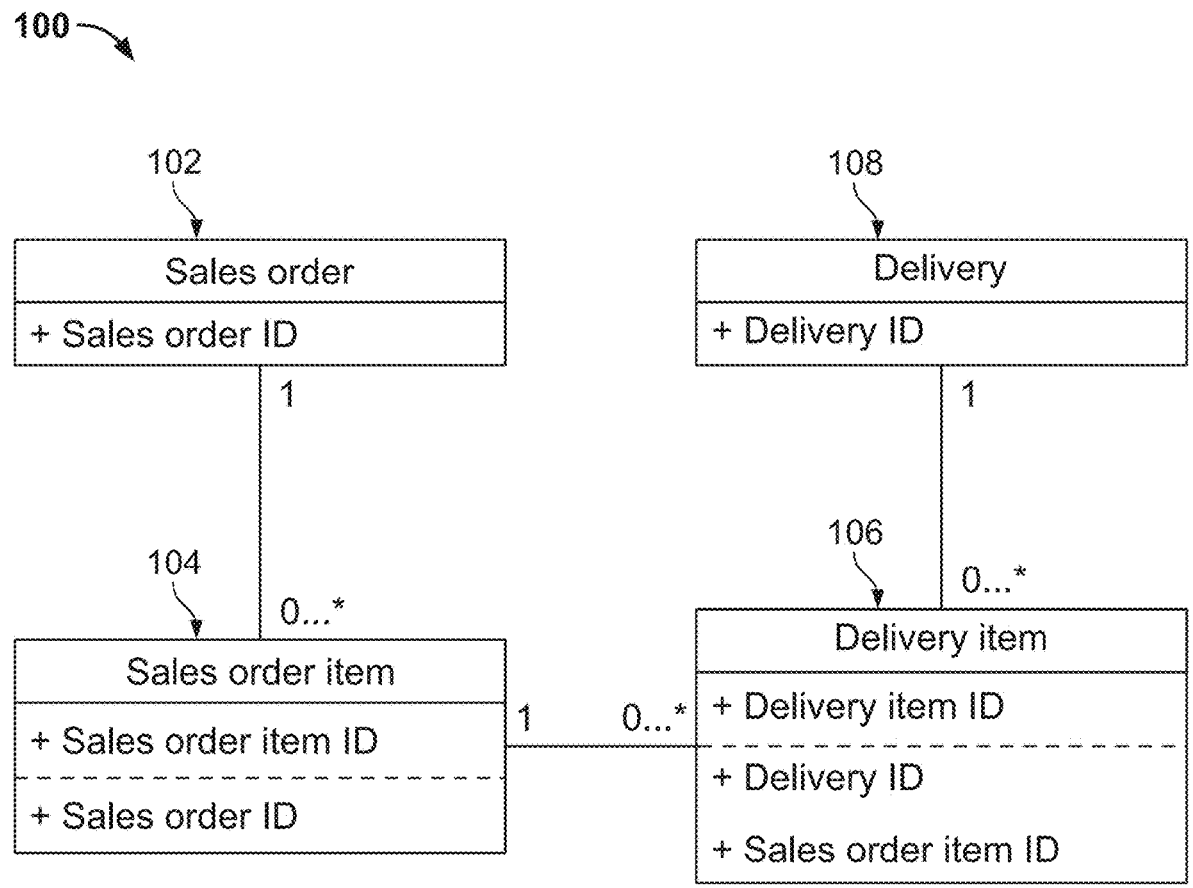
FIG. 1 shows an exemplary process data model on which object centric process mining may be performed in accordance with one or more embodiments.

FIG. 1 shows an exemplary process data model 100 on which object centric process mining may be performed in accordance with one or more embodiments. Process data model 100 represents a plurality of entities, and their relationships, of a process (also referred to as a workflow). As used herein, an entity refers to an abstract conceptual grouping of events of a process. For example, as shown in FIG. 1, process data model 100 is for a P2P (process-to-pay) process comprising the following entities: sales order entity 102, sales order item entity 104, delivery item entity 106, and delivery entity 108. However, process data model 100 may be for any other suitable process. In one embodiment, process data model 100 is for an RPA (robotic process automation) process performed (e.g., automatically or semi-automatically) using one or more RPA robots. Such RPA robots are software robots executing on one or more computing systems (such as, e.g., computing system 1000 of FIG. 10) for performing the process.

Conventionally, process mining is performed on an event log of the execution of a process. The event log is generated from execution data of the process by selecting only one of the entities of the process as the case ID (identifier) for analysis, thereby flattening the multi-dimensional execution data into a single dimension. This results in an event log that may not include all of the data in the execution data, that may include behavior that does not exist in the execution data, that may include duplicate data, and that may result in computation of incorrect metrics.

Advantageously, embodiments described herein provide for object centric process mining of a process that considers all entities for visualizing execution of the process in a process graph. Since all entities are considered, no data is lost.

Figure 2:
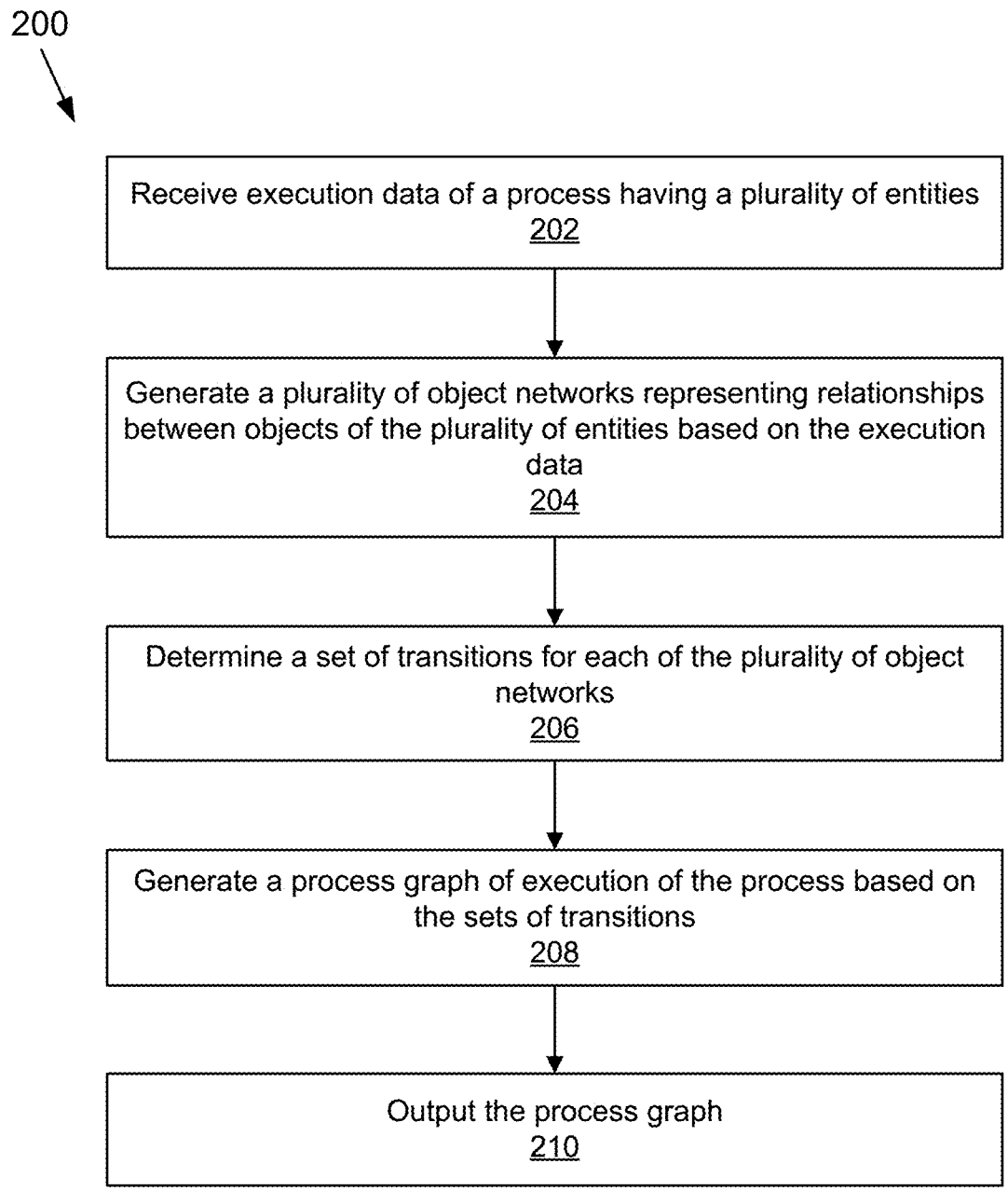
FIG. 2 shows a method for performing object centric process mining on a process, in accordance with one or more embodiments.

FIG. 2 shows a method 200 for performing object centric process mining on a process, in accordance with one or more embodiments. Method 200 may be performed by one or more computing devices, such as, e.g., computing system 1000 of FIG. 10.

At step 202 of FIG. 2, execution data of a process having a plurality of entities is received. The execution data may comprise any suitable data on the execution of the process.

In one embodiment, the execution data comprises a list of objects of each entity and a list of events of each entity. As used herein, an object of an entity refers to an instance of the entity. For example, as shown in FIG. 1, sales order entity 102 may comprise one or more sales order ID objects, sales order item entity 104 may comprise one or more sales order item ID objects, delivery item entity 106 may comprise one or more delivery item ID objects, and delivery entity 108 may comprise one or more delivery ID objects.

The lists of objects of each entity and the lists of events of each entity may be in any suitable format. In one embodiment, the list of objects of each entity comprises an object table, for each respective entity of the plurality of entities, providing a unique ID (identifier) for each object of the respective entity and the list of events for each entity comprises an events table identifying events for the objects. Exemplary object tables are shown in FIGS. 3A-3D and an exemplary event table is shown in FIG. 4, in accordance with one or more embodiments. The object tables and the events table may be TSV (tab-separated values) files or may be of any other suitable format.

FIG. 3A shows an exemplary object table 300 for the sales order entity providing unique IDs for the sales order ID object 302. FIG. 3B shows an exemplary object table 310 for the sales order item entity providing unique IDs for the sales order item ID object 312 and sales order IDs 314. FIG. 3C shows an exemplary object table 320 for the delivery item entity providing unique IDs for the delivery item ID object 322, delivery IDs 324, and sales order item IDs 326. FIG. 3D shows an exemplary object table 330 for the delivery entity providing unique IDs for the delivery ID object 332. As can be seen from FIGS. 3A-3D, object tables 300, 310, 320, and 330 identify which objects are related to each other. It should be understood that the identification of which objects are related to each other in object tables 300, 310, 320, and 330 of FIGS. 3A-3D may be represent in any other suitable format.

FIG. 4 shows an exemplary event table 400. Event table 400 comprises rows 402 each corresponding to an event and column 404 identifying an activity of the event, column 406 identifying an event end time of the event, and columns 408-414 respectively identifying delivery ID object, delivery item ID object, sales order ID object, and sales order item ID object to identify the object to which the event belongs. As shown in FIG. 4, each event uniquely relates to exactly one object.

The execution data may be received by loading the execution data from a storage or memory of a computer system or receiving the execution data from a remote computer system.

At step 204 of FIG. 2, a plurality of object networks of objects of the plurality of entities is generated based on the execution data. The object networks are connected components of objects that relate to each other. The relationship between objects is determined based on the execution data. Each object network is assigned a unique object network ID.

Figure 5:
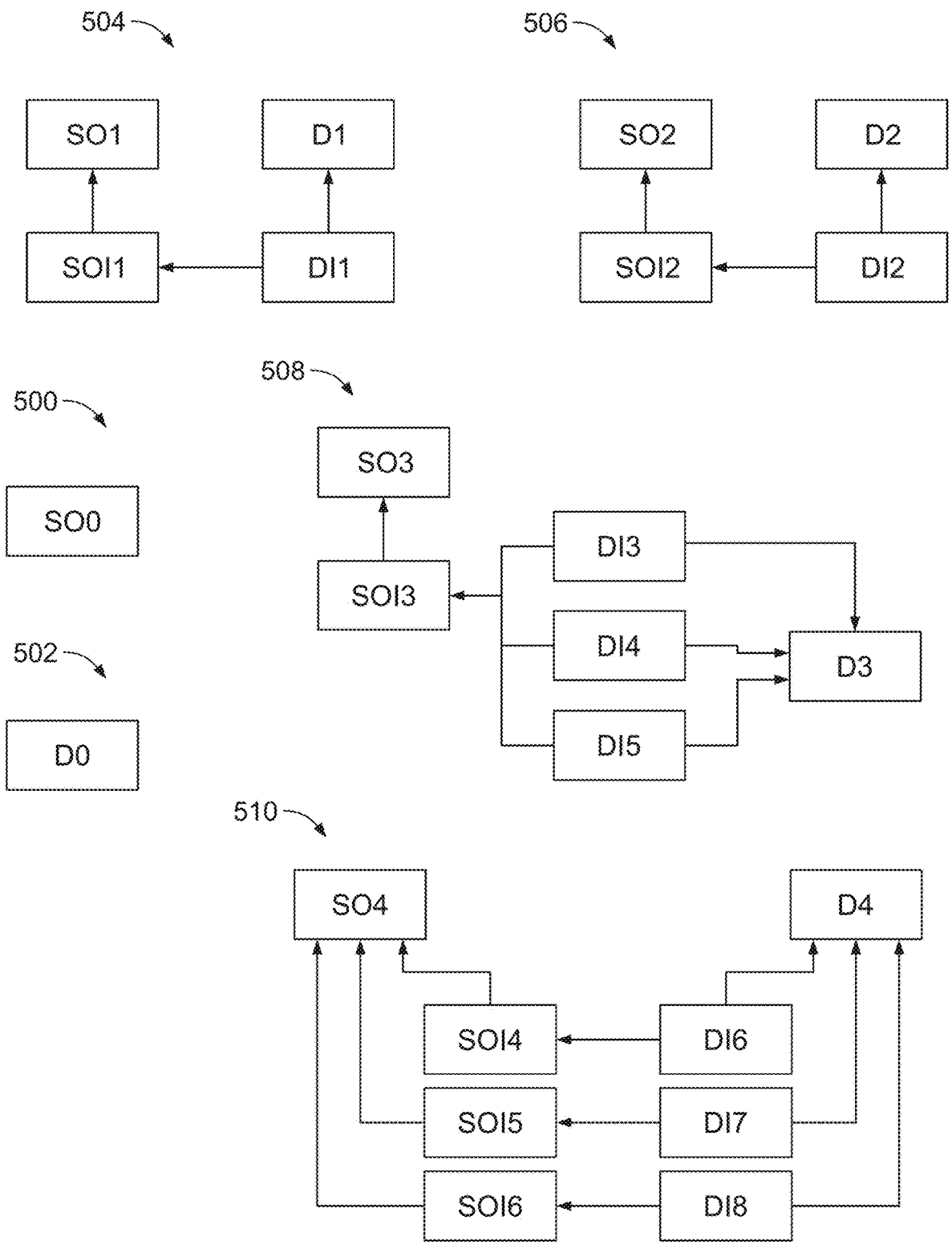
FIG. 5 shows exemplary object networks in accordance with one or more embodiments.

FIG. 5 shows exemplary object networks 500-510, in accordance with one or more embodiments, where SO refers to sales order, SOI refers to sales order item, D refers to delivery, and DI refers to delivery item. Object networks 500-510 are generated based on object tables 300, 310, 320, and 330 of FIGS. 3A-3D.

At step 206 of FIG. 2, a set of transitions is determined for each of the plurality of object networks. Each set of transitions represent one or more transitions from a source activity of an event in an object network to a destination activity of an event in the object network. The set of transitions may include directly follows transitions and/or multi-transitions. The directly follows transitions identify relationships between two events within one object and may be denoted as (fromActivity, toActivity, fromEventId, toEventId). The multi-transitions identify relationships from one or more events to one or more events of a same activity but different entities and may be denoted as (fromActivity, toActivity, {fromEventIds}, {toEventIds}).

In one embodiment, a set of transitions is determined for a respective object network by first determining an ordered object network trace of the respective object network. In general, for each event in the ordered object network trace, its preceding events are evaluated to determine directly follows transitions and/or multi-transitions based on halting and skip conditions. More specifically, for each event in the ordered object network trace, events are analyzed starting from its direct preceding event all the way back to the first event of the ordered object network trace, checking for halting and skip conditions along the way and determining the directly follows transitions and multi-transitions between events based on the conditions. Determining a set of transitions for a respective object network is described in further detail below with respect to method 600 of FIG. 6.

Figure 6:
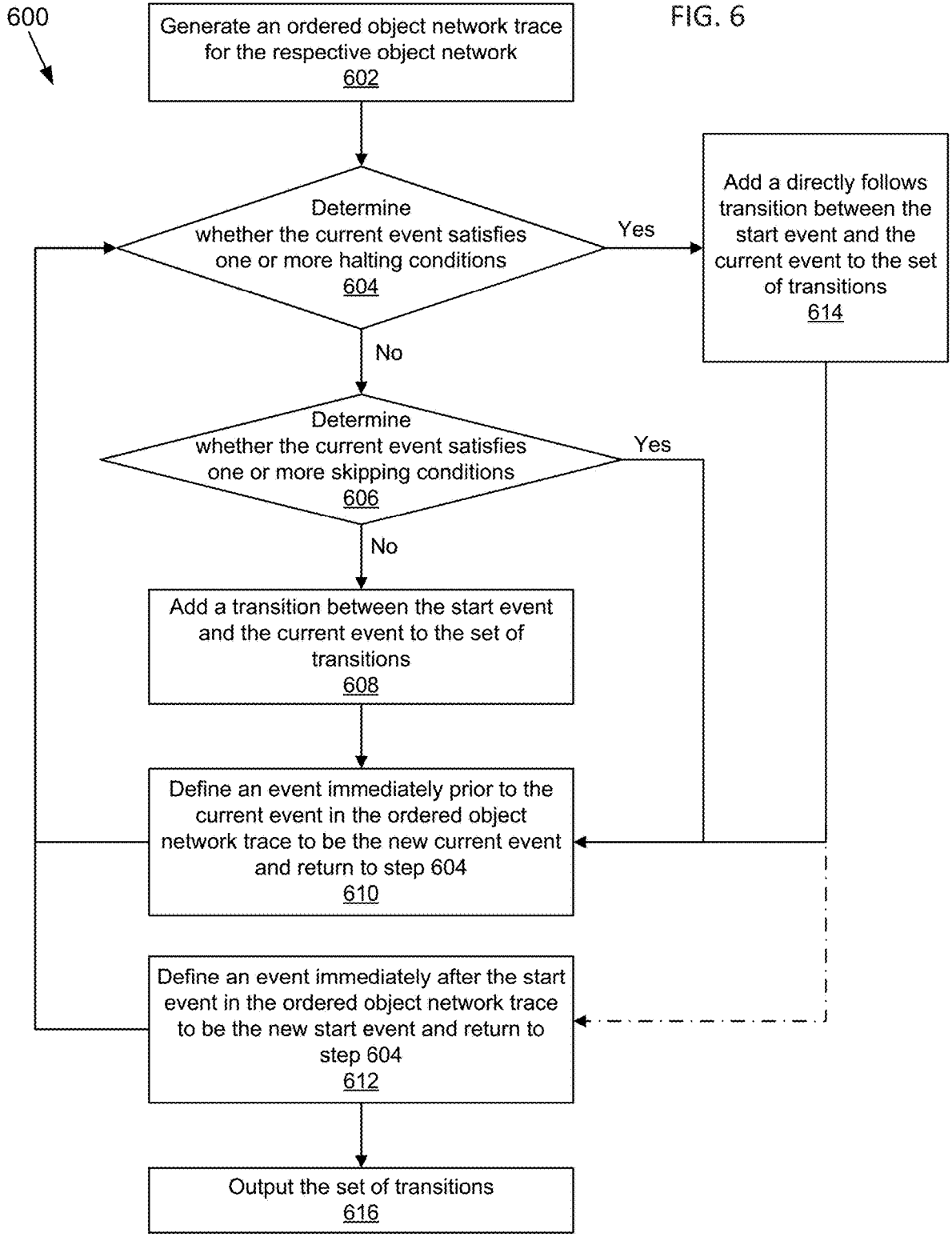
FIG. 6 shows a method for determining a set of transitions for a respective object network, in accordance with one or more embodiments.

FIG. 6 shows a method 600 for determining a set of transitions for a respective object network, in accordance with one or more embodiments. Method 600 of FIG. 6 may be repeatedly performed at step 206 of FIG. 2 for each respective object network of the plurality of object networks. Method 600 may be performed by one or more computing devices, such as, e.g., computing system 1000 of FIG. 10.

At step 602 of FIG. 6, an ordered object network trace is generated for the respective object network. The ordered object network trace of the respective object network comprises all events that belong to any of the objects in the respective object network sorted temporally (e.g., from the first executed event to the last executed event).

In one example, the following ordered object network traces are generated for object networks 500-510 of FIG. 5. Each event of the ordered object network trace are denoted as X:Y, where Y represents the activity label and X represents the identifier of the corresponding object in FIG. 5.

| Object Network | Ordered Object Network Trace |
| --- | --- |
| Object Network 500 | SO0: Create SO |
| Object Network 502 | D0: Post Goods Issue |
| Object Network 504 | SO1: Create SO → SOI1: Create SO1 → DI1: Create DI → D1: Post Goods Issue |
| Object Network 506 | SO2: CreateSO → SOI2: Create SOI → SO2: Change SO Requested Delivery Date → DI2: Create DI → D2: Post Goods Issue |
| Object Network 508 | SO3: Create SO → SOI3: Create SOI → DI3: Create DI → DI4: Create DI → DI3: Change Delivery Item Quantity → DI4: Change Delivery Item Quantity → DI5: Create DI → DI5: Change Delivery Item Quantity → D3: Post Goods Issue |
| Object Network 510 | SO4: Create SO → SOI4: Create SOI → SOI5: Create SOI → SOI8: Create SOI → SI8: Create DI → DI7: Create DI → DI8: Create DI → D4: Post Goods Issue |

Steps 604-614 are performed for a current event of the ordered object network trace to determine a set of transitions for the ordered object network trace. In general, for each event in the ordered object network trace, the ordered object network trace is traced backwards by iteratively repeating steps 604-614 to evaluate its preceding events to determine a set of transitions based on halting and skip conditions. Accordingly, the current event is initially defined to be the start event, which is initially defined to be the first event of the ordered object network trace and steps 604-610 and 614 are iteratively repeated to trace the ordered object network trace backwards from the start event. At step 612, the start event is updated to be an event immediately after the start event and steps 604-610 and 614 are iteratively repeated to trace the ordered object network trace backwards from the updated start event. Steps 604-614 are thus iteratively repeated to trace the ordered object network trace backwards from each event. As used herein, the "current event" refers to the event of the ordered object network trace currently under consideration, the "first event" refers to the first event of the ordered object network trace, and the "start event" refers to the event of the ordered object network trace that is being traced backwards from (initially defined as the first event and iteratively chosen as an immediate next event of the ordered object network trace at step 612).

At step 604 of FIG. 6, it is determined whether the current event of the ordered object network trace satisfies one or more halting conditions. The halting conditions may be any suitable condition for halting the trace of the ordered object network trace. In one embodiment, the halting conditions comprise the current event being the first event of the ordered object network trace. In one embodiment, the halting conditions comprise the current event being of the same object as the start event of the ordered object network trace (that we initially started tracing back from). In one embodiment, the halting conditions comprise the current event being of a second different entity type encountered between the start event and the current event in the ordered object network trace.

In response to determining that the current event does not satisfy the one or more halting conditions at step 604, it is determined whether the current event satisfies one or more skipping conditions at step 606 of FIG. 6. The skipping conditions may be any suitable condition for skipping the current event in the trace of the ordered object network trace. In one embodiment, the skipping conditions comprise the current event being of a same entity but different object than any event between (and including) the start event and the current event of the ordered object network trace. In one embodiment, the skipping conditions comprise the current event belonging to the same object than any event between (and including) the start event and the current event of the ordered object network trace.

In response to determining that the current event satisfies the one or more skipping conditions at step 606, the current event is skipped in the trace of the ordered object network trace and method 600 proceeds to step 610 of FIG. 6.

In response to determining that the current event does not satisfy the one or more skipping conditions at step 606, a transition (e.g., a directly follows transition or a multi-transition) between the start event and the current event is added to the set of transitions at step 608 of FIG. 6 and an event immediately prior to the current event in the ordered object network trace is defined as the new current event and method 600 returns to step 604 at step 610 of FIG. 6 using the new current event as the current event. Accordingly, steps 604-608 and 614 are repeatedly performed for each event prior to the current event, to thereby trace the ordered object network trace backwards from the current event.

In response to determining that the current event satisfies the one or more halting conditions at step 604, method 600 proceeds to step 614. In a first embodiment of the present invention, the goal is to find all directly-follows transitions. Accordingly, in response to determining that the halting condition of the current event being of the same object as the start event at step 604 of FIG. 6, a directly follows transition between the start event and the current event is added to the set of transitions at step 614. At the same time, in response to determining that the halting condition of the current event being of a second different entity type encountered between the start event and the current event in the ordered object network trace, the searching for interactions is halted but searching for directly follows transitions continues. As such, method 600 proceeds to step 610 to continue searching for directly follows transitions. In a second embodiment of the present invention, the goal is to find directly follows transitions that are part of the end-to-end process flow. Accordingly, in response to determining that the halting condition of the current event being of the same object as the start event is satisfied at step 604 of FIG. 6, a directly follows transition between the current event and the start event is added to the set of transitions at step 614 of FIG. 6 only if the halting condition of the current event being of a second different entity type encountered between the start event and the current event in the ordered object network trace is not satisfied. In both embodiments, in response to determining that the halting condition of the current event being the first event of the ordered object network trace is satisfied, method 600 proceeds to step 612 (shown as a dotted-dashed lined arrow in FIG. 6).

At step 612 of FIG. 6, an event immediately after the start event in the ordered object network trace is defined as the new start event and method 600 returns to step 604 using the new start event as the start event. In this manner, once one or more halting conditions are satisfied (step 604), steps 604-610 are iteratively repeated to perform a backwards trace for each event of the ordered object network trace (until there are no remaining events after the start event).

At step 616 of FIG. 6, the set of transitions for the respective object network is output. The set of transitions for the respective object network can be output by, for example, displaying the set of transitions for the respective object network on a display device of a computer system, storing the set of transitions for the respective object network on a memory or storage of a computer system, or by transmitting the set of transitions for the respective object network to a remote computer system.

Figure 7:
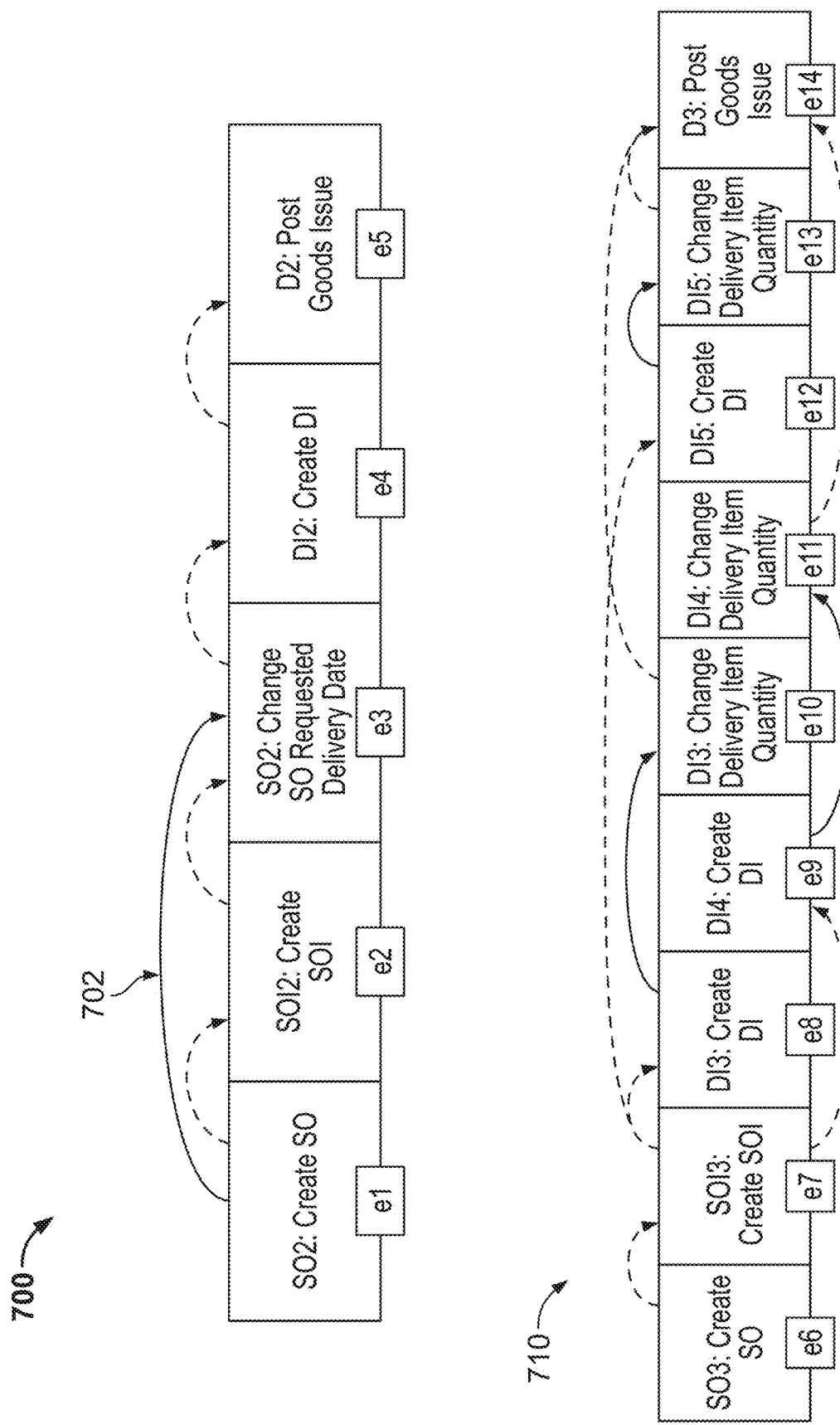
FIG. 7 illustratively shows visualizations of a set of transitions determined from object networks in accordance with one or more embodiments.

FIG. 7 illustratively shows visualizations of a set of transitions determined from object networks according to method 600 of FIG. 6, in accordance with one or more embodiments. Visualization 700 is a visualization of the set of transitions mined from object network 506 of FIG. 5 and visualization 710 is a visualization of the set of transitions mined from object network 508 of FIG. 5 (visualizations of the sets of transitions mined from object networks 500, 502, 504, and 510 are not shown in FIG. 7 for brevity). In FIG. 7, the dashed-lined arrows represent multi-transitions while the solid-lined arrows represent directly follows transitions.

Visualizations 700 and 710 show the mining of the following directly follows transitions:
(Create SO, Change SO requested delivery date, e1, e3);
(Create DI, Change delivery item quantity, e8, e10);
(Create DI, Change delivery item quantity, e9, e11); and
(Create DI, Change delivery item quantity, e12, e13).

Visualizations 700 and 710 show the mining of the following multi-transitions:

(Create SO, Create SOI, {e1}, {e2});
(Create SOI, Change delivery item quantity, {e2}, {e3});
(Change delivery item quantity, Create DI, {e3}, {e4});
(Create DI, Post Goods Issue, {e4}, {e5});
(Create SO, Create SOI, {e6}, {e7});
(Create SOI, Create DI, {e7}, {e8, e9, e12}); and
(Change delivery item quantity, Post Goods Issue, {e10, e11, e13}, {e14}).

In visualization 700, arrow 702 representing a directly follows transition from activity SO2: Create SO to activity SO2: Change SO requested delivery date, and the directly follows transition (Create SO, Change SO requested delivery date, e1, e3), is only generated during the embodiment when step 614 of FIG. 6 is performed.

Returning back to FIG. 2, at step 208, a process graph of execution of the process is generated based on the sets of transitions. In one embodiment, the process graph is generated by converting the sets of transitions to a graph where each activity in the sets of transitions is represented as a node of the graph and the transitions between the activities in the sets of transitions are represented as edges connecting the nodes. The edges are weighted based on a frequency count of transitions between the same activities. For example, the transitions mined from visualizations 700 and 710 of FIG. 7 would result in the following edges:

- A directly follows edge Create DI→Change delivery item quantity with an edge weight of 3;
- A directly follows edge Create SO→Change SO requested delivery date with an edge weight of 1 (this edge is only present when step 614 of FIG. 6 is performed);
- A multi-transition edge Create SO→Create SOI with a "fromCount" of 2 and a "toCount" of 2;
- A multi-transition edge Create SOI→Create DI with a "fromCount" of 1 and a "toCount" of 3; and
- A multi-transition edge Change delivery item quantity-→Post Goods Issue with a "fromCount" of 3 and a "toCount" of 1.

Figure 8:
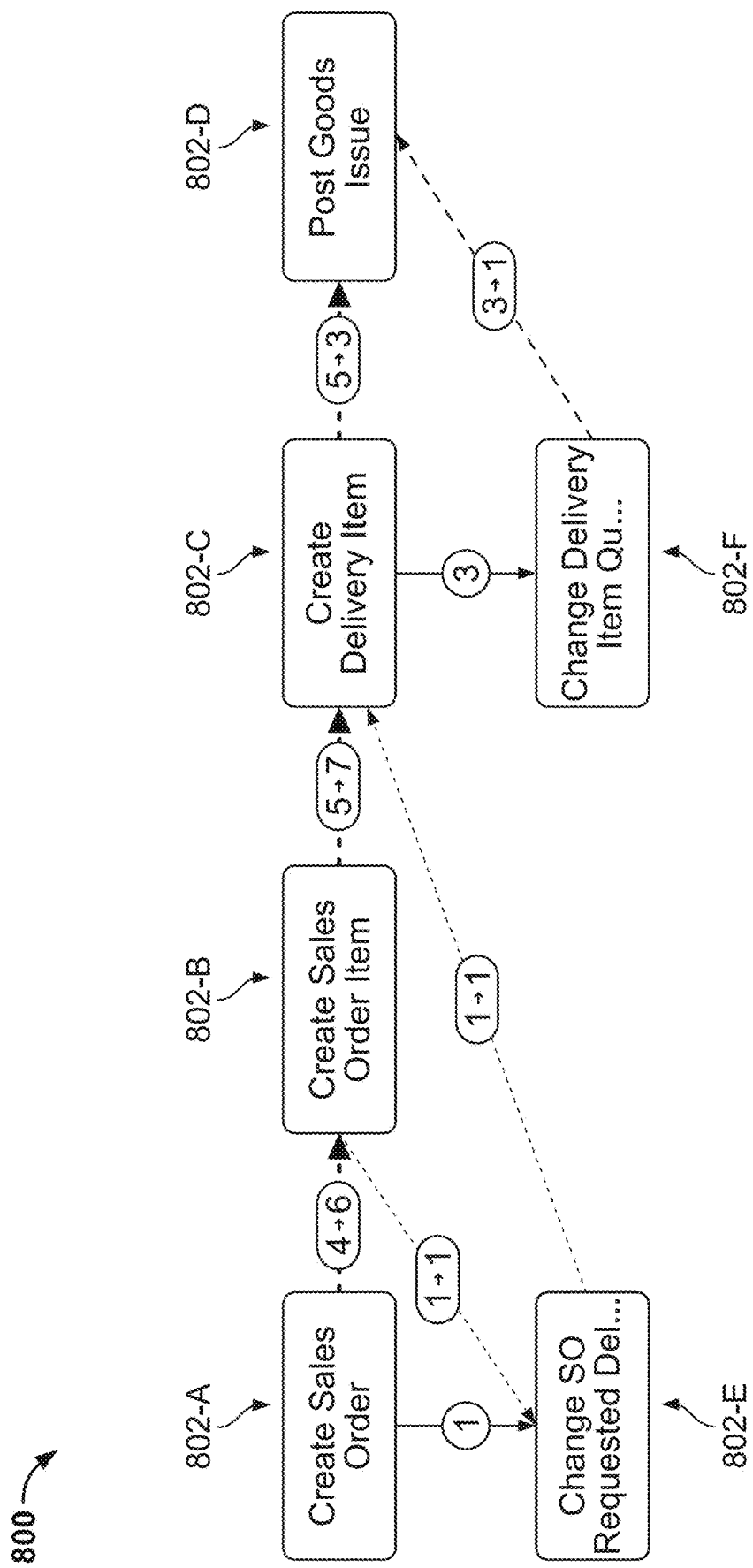
FIG. 8 shows an exemplary process graph of execution of a process in accordance with one or more embodiments

An exemplary process graph generated from the transitions mined from visualizations 700 and 710 of FIG. 7 is shown in FIG. 8.

FIG. 8 shows an exemplary process graph 800 of execution of a process generated from the transitions mined from visualizations 700 and 710 of FIG. 7 in accordance with one or more embodiments. In one example, process graph 800 is generated at step 208 of FIG. 2. Process graph 800 comprises nodes 802-A through 802-F (collectively referred to as nodes 802) connected by edges. Nodes 802-A and 802-E correspond to a sales order entity, node 802-B corresponds to a sales order item entity, nodes 802-D and 802-F correspond to a delivery item entity, and node 802-D corresponds to a delivery entity. Nodes 802 may be visualized by a different color (or any other visual distinction) for each entity. As shown in FIG. 8, edges connecting nodes 802 may be one of two types: edges between entities (e.g., between two sales order activities) represented as solid line arrows in FIG. 8 or interaction edges between different entities represented as dashed line arrows in FIG. 8. The edges between entities represent directly follow transitions weighted with a frequency count. For example, the edge between create sales order node 802-A and change SO requested delivery date node 802-E has a weight of one representing a single transition between the nodes. The interaction edges represent multi-transitions weighted with (first weight→second weight), where the first weight represents the frequency of the activity of the from-node and the second weight represents the frequency of the activity of the to-node. For example, the interaction edge from create sales order node 802-A to create sales order item node 802-B represents out of four sales orders created six sales order items were created. The edges may be visualized according to the weights. For example, the thickness of the edges may be scaled according to the weights of the edges. Advantageously, process graph 800 does not have data that is missing from the execution data, does not include behavior that is not in the execution data, enables accurate computation of metrics, and does not duplicate data.

Returning back to FIG. 2, at step 210, the process graph is output. For example, the process graph can be output by displaying the process graph on a display device of a computer system, storing the process graph on a memory or storage of a computer system, or by transmitting the process graph to a remote computer system.

In one embodiment, one or more metrics may be computed based on the process graph. For example, the one or more metrics may be object centric performance metrics (e.g., timing metrics) calculated based on the relationships or interactions between entities.

Figure 9:
FIG. 9 shows tables of results of conventional "classic" PM (process mining) and results of OCPM (object centric process mining) generated according to embodiments described herein, as compared with actual results in the execution data of a process.

Embodiments described herein were experimentally validated and compared with conventional process mining techniques. FIG. 9 shows tables 900 of results of conventional "classic" PM (process mining) (in the "Classic" PM column) and results of OCPM (object centric process mining) generated according to embodiments described herein (in the OCPM column), as compared with actual results in the execution data of a process (in the Data column). As shown in tables 900, conventional process mining interpreted many errors in interpreting the number of entities and events while the object centric process mining in accordance with embodiments described herein are accurate. For example, in conventional classic process mining, some events have a higher number of occurrences while other events have a lower number of occurrences as compared to the actual occurrences of the events, whereas the number of events is accurately captured by object centric process mining in accordance with embodiments described herein. Further, in the process graph, the edges and metrics are incorrect in conventional classic process mining while the edges and metrics are correct in object centric process mining in accordance with embodiments described herein.

Figure 10:
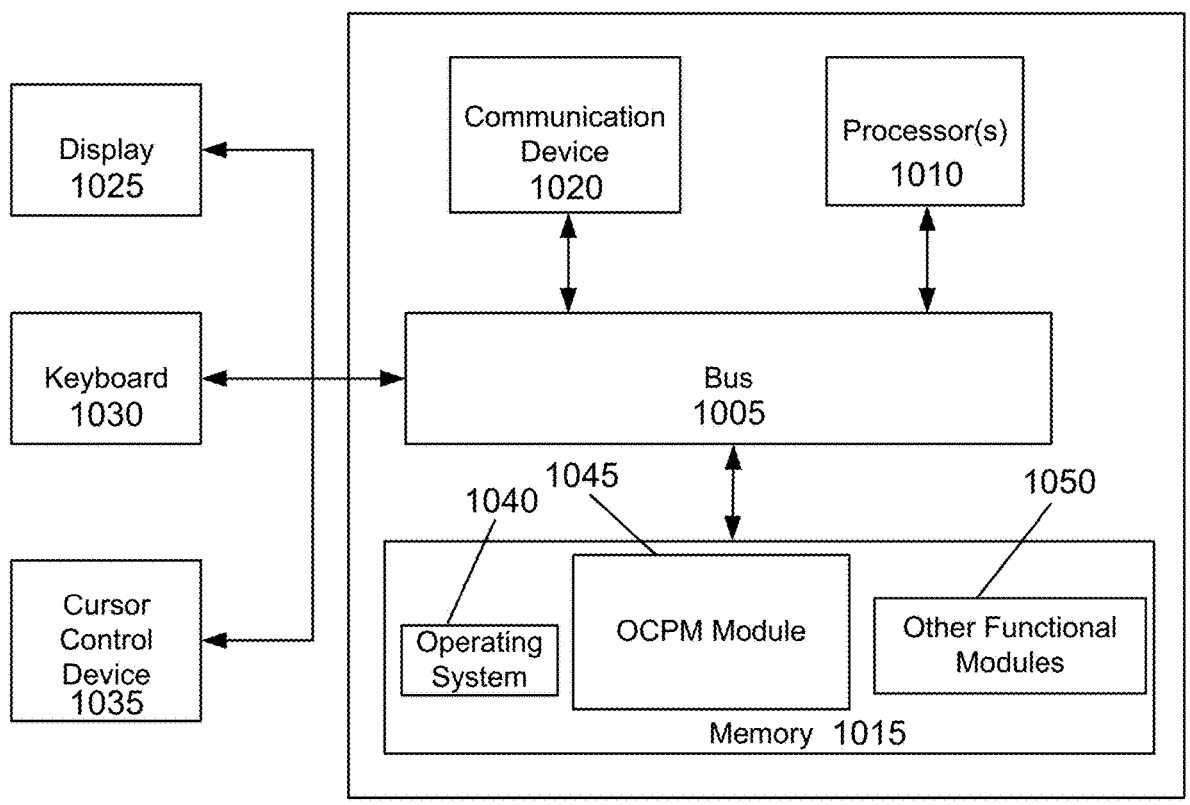
FIG. 10 is an architectural diagram illustrating a computing system configured to perform object centric process mining, in accordance with one or more embodiments.

FIG. 10 is an architectural diagram illustrating a computing system 1000 configured to perform object centric process mining, according to an embodiment of the present invention. In some embodiments, computing system 1000 may be one or more of the computing systems depicted and/or described herein. Computing system 1000 includes a bus 1005 or other communication mechanism for communicating information, and processor(s) 1010 coupled to bus 1005 for processing information. Processor(s) 1010 may be any type of general or specific purpose processor, including a Central Processing Unit (CPU), an Application Specific Integrated Circuit (ASIC), a Field Programmable Gate Array (FPGA), a Graphics Processing Unit (GPU), multiple instances thereof, and/or any combination thereof. Processor(s) 1010 may also have multiple processing cores, and at least some of the cores may be configured to perform specific functions. Multi-parallel processing may be used in some embodiments. In certain embodiments, at least one of processor(s) 1010 may be a neuromorphic circuit that includes processing elements that mimic biological neurons. In some embodiments, neuromorphic circuits may not require the typical components of a Von Neumann computing architecture.

Computing system 1000 further includes a memory 1015 for storing information and instructions to be executed by processor(s) 1010. Memory 1015 can be comprised of any combination of random access memory (RAM), read-only memory (ROM), flash memory, cache, static storage such as a magnetic or optical disk, or any other types of non-transitory computer-readable media or combinations thereof. Non-transitory computer-readable media may be any available media that can be accessed by processor(s) 1010 and may include volatile media, non-volatile media, or both. The media may also be removable, non-removable, or both. Computing system 1000 includes a communication device 1020, such as a transceiver, to provide access to a communications network via a wireless and/or wired connection. In some embodiments, communication device 1020 may include one or more antennas that are singular, arrayed, phased, switched, beamforming, beamsteering, a combination thereof, and/or any other antenna configuration without deviating from the scope of the invention.

Processor(s) 1010 are further coupled via bus 1005 to a display 1025. Any suitable display device and haptic I/O may be used without deviating from the scope of the invention.

A keyboard 1030 and a cursor control device 1035, such as a computer mouse, a touchpad, etc., are further coupled to bus 1005 to enable a user to interface with computing system 1000. However, in certain embodiments, a physical keyboard and mouse may not be present, and the user may interact with the device solely through display 1025 and/or a touchpad (not shown). Any type and combination of input devices may be used as a matter of design choice. In certain embodiments, no physical input device and/or display is present. For instance, the user may interact with computing system 1000 remotely via another computing system in communication therewith, or computing system 1000 may operate autonomously.

Memory 1015 stores software modules that provide functionality when executed by processor(s) 1010. The modules include an operating system 1040 for computing system 1000. The modules further include an OCPM (object centric process mining) module 1045 that is configured to perform all or part of the processes described herein (e.g., method 200 of FIG. 2 and/or method 600 of FIG. 6) or derivatives thereof. Computing system 1000 may include one or more additional functional modules 1050 that include additional functionality.

One skilled in the art will appreciate that a "computing system" could be embodied as a server, an embedded computing system, a personal computer, a console, a personal digital assistant (PDA), a cell phone, a tablet computing device, a quantum computing system, or any other suitable computing device, or combination of devices without deviating from the scope of the invention. Presenting the above-described functions as being performed by a "system" is not intended to limit the scope of the present invention in any way, but is intended to provide one example of the many embodiments of the present invention. Indeed, methods, systems, and apparatuses disclosed herein may be implemented in localized and distributed forms consistent with computing technology, including cloud computing systems. The computing system could be part of or otherwise accessible by a local area network (LAN), a mobile communications network, a satellite communications network, the Internet, a public or private cloud, a hybrid cloud, a server farm, or any combination thereof, etc. Any localized or distributed architecture may be used without deviating from the scope of the invention.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, include one or more physical or logical blocks of computer instructions that may, for instance, be organized as an object, procedure, or function. Nevertheless, the executables of an identified module need not be physically located together, but may include disparate instructions stored in different locations that, when joined logically together, comprise the module and achieve the stated purpose for the module. Further, modules may be stored on a computer-readable medium, which may be, for instance, a hard disk drive, flash device, RAM, tape, and/or any other such non-transitory computer-readable medium used to store data without deviating from the scope of the invention.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

The process steps performed in FIGS. 2 and 6 may be performed by a computer program, encoding instructions for the processor(s) to perform at least part of the process(es) described in FIGS. 2 and 6, in accordance with embodiments of the present invention. The computer program may be embodied on a non-transitory computer-readable medium. The computer-readable medium may be, but is not limited to, a hard disk drive, a flash device, RAM, a tape, and/or any other such medium or combination of media used to store data. The computer program may include encoded instructions for controlling processor(s) of a computing system (e.g., processor(s) 1010 of computing system 1000 of FIG. 10) to implement all or part of the process steps described in FIGS. 2 and 6, which may also be stored on the computer-readable medium.

The computer program can be implemented in hardware, software, or a hybrid implementation. The computer program can be composed of modules that are in operative communication with one another, and which are designed to pass information or instructions to display. The computer program can be configured to operate on a general purpose computer, an ASIC, or any other suitable device.

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:
1. A computer-implemented method comprising:
receiving execution data of a process having a plurality of entities;
generating a plurality of object networks representing relationships between objects of the plurality of entities based on the execution data;
determining a set of transitions for each of the plurality of object networks by:
generating an ordered object network trace for each respective one of the plurality of object networks, and
determining the set of transitions for each of the plurality of object networks by, for each particular event of its ordered object network trace, iteratively analyzing each prior event in the ordered object network trace starting from an event directly preceding the particular event to a first event;
generating a process graph of execution of the process based on the sets of transitions; and
storing the process graph in memory of a computer system.

2. The computer-implemented method of claim 1, wherein determining the set of transitions for each of the plurality of object networks by, for each particular event of its ordered object network trace, iteratively analyzing each prior event in the ordered object network trace starting from an event directly preceding the particular event to a first event comprises, for each respective ordered object network trace of the ordered object network traces:
for a current event of the respective ordered object network trace, the current event initially being a first event of the respective ordered object network trace, performing the following steps:
a) determining whether the current event satisfies one or more halting conditions;
b) in response to determining that the current event does not satisfy the one or more halting conditions, determining whether the current event satisfies one or more skip conditions;
c) in response to determining that the current event does not satisfy the one or more skip conditions, adding a transition between a start event and the current event to the set of transitions, defining an event immediately prior to the current event in the respective ordered object network trace to be the new current event, and returning to step a); and
d) in response to determining that the current event satisfies the one or more halting conditions, defining an event immediately after the start event in the respective ordered object network trace to be the new start event and returning to step a).

3. The computer-implemented method of claim 2, wherein defining an event immediately after the start event in the respective ordered object network trace to be the new start event and returning to step a) comprises:
in response to determining that the current event belongs to the same object as the start event, adding a directly follows transition between the start event and the current event to the set of transitions.

4. The computer-implemented method of claim 2, wherein the one or more halting conditions comprise at least one of: 1) the current event being the first event of the respective ordered object network trace, 2) the current event being of the same object as the start event, or 3) the current event being of a second different entity type encountered between the start event and the current event in the respective ordered object network trace.

5. The computer-implemented method of claim 2, wherein the one or more skipping conditions comprise at least one of: 1) the current event being of a same entity but different object than any event between the start event and the current event in the respective ordered object network trace or 2) the current event belonging to the same object than any event between the start event and the current event in the respective ordered object network trace.

6. The computer-implemented method of claim 1, wherein the execution data comprises 1) an object table, for each of the plurality of entities, identifying the objects of that entity and 2) an event table identifying events of the plurality of entities.

7. The computer-implemented method of claim 1, wherein generating a plurality of object networks representing relationships between objects of the plurality of entities based on the execution data comprises:
generating the plurality of object networks as connected components of the objects of the entities that are related.

8. The computer-implemented method of claim 1, wherein generating a process graph of execution of the process based on the sets of transitions comprises:
representing each activity of the sets of transitions as a node of the process graph and transitions between the activities in the sets of transitions as edges connecting the nodes; and
weighting one or more of the edges based on a frequency count of transitions between the same activities in the sets of transitions.

9. The computer-implemented method of claim 1, wherein the process is a robotic process automation process.

10. An apparatus comprising:
a memory storing computer instructions; and
at least one processor configured to execute the computer instructions, the computer instructions configured to cause the at least one processor to perform operations of:
receiving execution data of a process having a plurality of entities;
generating a plurality of object networks representing relationships between objects of the plurality of entities based on the execution data;
determining a set of transitions for each of the plurality of object networks by:
generating an ordered object network trace for each respective one of the plurality of object networks, and
determining the set of transitions for each of the plurality of object networks by, for each particular event of its ordered object network trace, iteratively analyzing each prior event in the ordered object network trace starting from an event directly preceding the particular event to a first event;
generating a process graph of execution of the process based on the sets of transitions; and
storing the process graph in the memory.

11. The apparatus of claim 10, wherein determining the set of transitions for each of the plurality of object networks by, for each particular event of its ordered object network trace, iteratively analyzing each prior event in the ordered object network trace starting from an event directly preceding the particular event to a first event traces:
for a current event of the respective ordered object network trace, the current event initially being a first event of the respective ordered object network trace, performing the following steps:
a) determining whether the current event satisfies one or more halting conditions;
b) in response to determining that the current event does not satisfy the one or more halting conditions, determining whether the current event satisfies one or more skip conditions;
c) in response to determining that the current event does not satisfy the one or more skip conditions, adding a transition between a start event and the current event to the set of transitions, defining an event immediately prior to the current event in the respective ordered object network trace to be the new current event, and returning to step a); and d) in response to determining that the current event satisfies the one or more halting conditions, defining an event immediately after the start event in the respective ordered object network trace to be the new start event and returning to step a).

12. The apparatus of claim 11, wherein defining an event immediately after the start event in the respective ordered object network trace to be the new start event and returning to step a) comprises:
in response to determining that the current event belongs to the same object as the start event, adding a directly follows transition between the start event and the current event to the set of transitions.

13. The apparatus of claim 11, wherein the one or more halting conditions comprise at least one of: 1) the current event being the first event of the respective ordered object network trace, 2) the current event being of the same object as the start event, or 3) the current event being of a second different entity type encountered between the start event and the current event in the respective ordered object network trace.

14. The apparatus of claim 11, wherein the one or more skipping conditions comprise at least one of: 1) the current event being of a same entity but different object than any event between the start event and the current event in the respective ordered object network trace or 2) the current event belonging to the same object than any event between the start event and the current event in the respective ordered object network trace.

15. A non-transitory computer readable medium storing computer program instructions, the computer program instructions when executed by at least one processor cause the at least one processor to perform operations comprising:
receiving execution data of a process having a plurality of entities;
generating a plurality of object networks representing relationships between objects of the plurality of entities based on the execution data;
determining a set of transitions for each of the plurality of object networks by:
generating an ordered object network trace for each respective one of the plurality of object networks, and
determining the set of transitions for each of the plurality of object networks by, for each particular event of its ordered object network trace, iteratively analyzing each prior event in the ordered object network trace starting from an event directly preceding the particular event to a first event;
generating a process graph of execution of the process based on the sets of transitions; and
storing the process graph in memory of a computer system.

16. The non-transitory computer readable medium of claim 15, wherein determining the set of transitions for each of the plurality of object networks by, for each particular event of its ordered object network trace, iteratively analyzing each prior event in the ordered object network trace starting from an event directly preceding the particular event to a first event traces:
for a current event of the respective ordered object network trace, the current event initially being a first event of the respective ordered object network trace, performing the following steps:
a) determining whether the current event satisfies one or more halting conditions;
b) in response to determining that the current event does not satisfy the one or more halting conditions, determining whether the current event satisfies one or more skip conditions;
c) in response to determining that the current event does not satisfy the one or more skip conditions, adding a transition between a start event and the current event to the set of transitions, defining an event immediately prior to the current event in the respective ordered object network trace to be the new current event, and returning to step a); and
d) in response to determining that the current event satisfies the one or more halting conditions, defining an event immediately after the start event in the respective ordered object network trace to be the new start event and returning to step a).

17. The non-transitory computer readable medium of claim 15, wherein the execution data comprises 1) an object table, for each of the plurality of entities, identifying the objects of that entity and 2) an event table identifying events of the plurality of entities.

18. The non-transitory computer readable medium of claim 15, wherein generating a plurality of object networks representing relationships between objects of the plurality of entities based on the execution data comprises:
generating the plurality of object networks as connected components of the objects of the entities that are related.

19. The non-transitory computer readable medium of claim 15, wherein generating a process graph of execution of the process based on the sets of transitions comprises:
representing each activity of the sets of transitions as a node of the process graph and transitions between the activities in the sets of transitions as edges connecting the nodes; and
weighting one or more of the edges based on a frequency count of transitions between the same activities in the sets of transitions.

20. The non-transitory computer readable medium of claim 15, wherein the process is a robotic process automation process.

* * * * *